July 5, 1927.
V. L. GILPIN ET AL
1,635,079
AUTOMOBILE LOCK
Filed May 25, 1925    2 Sheets-Sheet 1
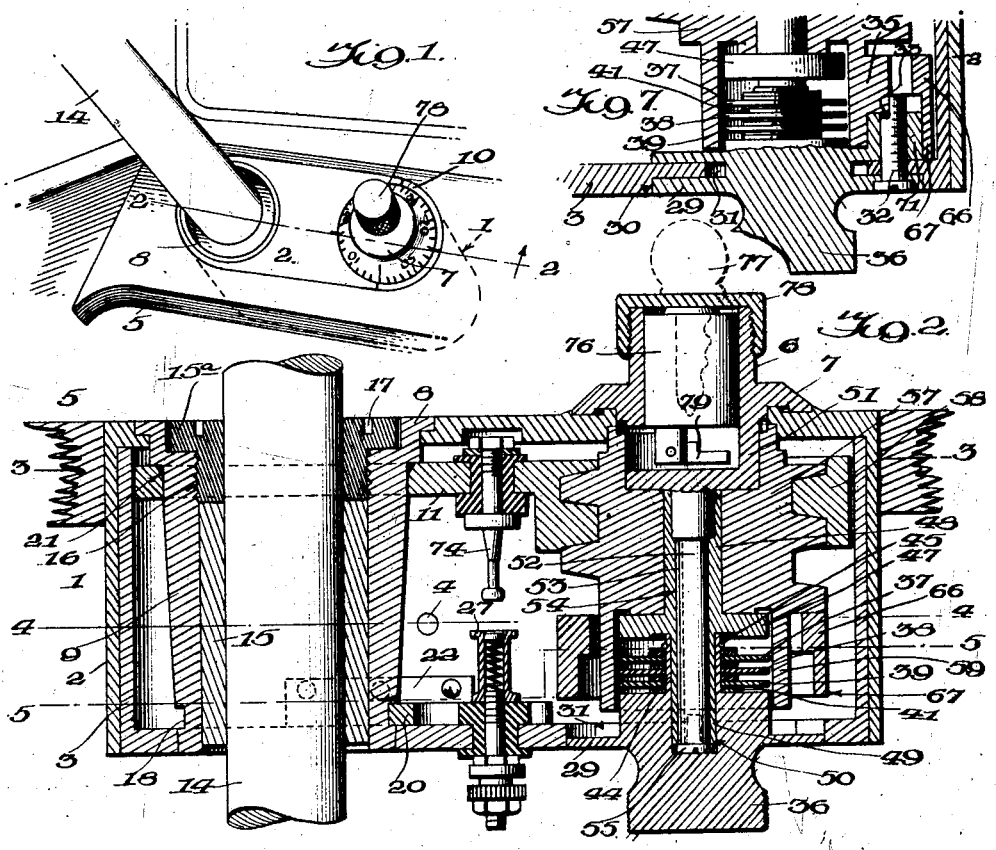
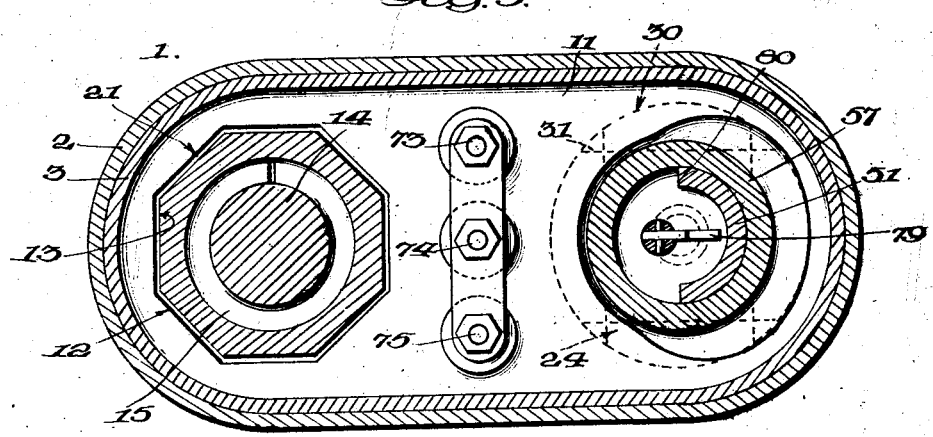
WITNESSES
INVENTOR
V. L. Gilpin,
C. R. Wells,
BY
ATTORNEYS

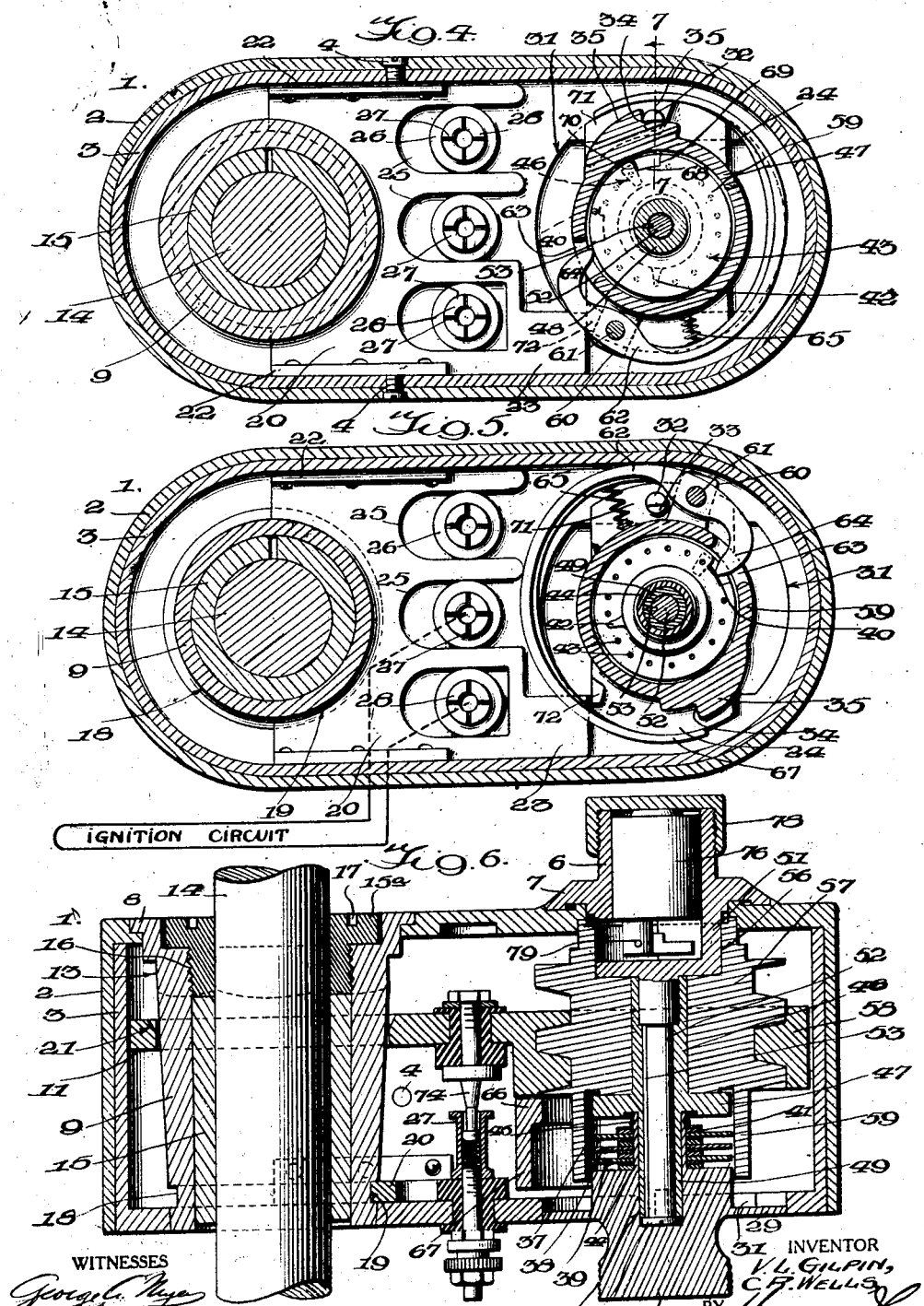

Patented July 5, 1927.

1,635,079

UNITED STATES PATENT OFFICE.

VICTOR L. GILPIN AND CHESTER READ WELLS, OF BALTIMORE, MARYLAND; SAID WELLS ASSIGNOR TO SAID GILPIN.

AUTOMOBILE LOCK.

Application filed May 25, 1925. Serial No. 32,690.

This invention relates to improvements in automobile locks, and it consists of the constructions, combinations and arrangements herein described and claimed.

An object of the invention is to provide a lock primarily for the purpose of securing or locking the steering post of an automobile against turning and simultaneously to break certain important electrical circuits, for example the ignition circuit, lighting circuit and horn circuit.

Another object of the invention is to provide a lock for the purpose described, arranged in such a manner that the various circuits are not broken until the locking plate goes in place upon the steering post nut.

Another object of the invention is to make use of a combination lock in carrying out the important functions of the invention.

Another object of the invention is to provide an automobile lock by means of which the steering post can be held in any one of a plurality of positions.

A further object of the invention is to provide a combined automobile lock and ignition circuit control, the use of which making it impossible to accidentally lock the steering post and leave the ignition circuit open so that the engine may be operated, the locking of the steering post insuring the breaking of the ignition circuit.

Other objects and advantages appear in the following specification, reference being had to the accompanying drawings, in which Figure 1 is a perspective view of enough of the instrument board of an automobile to illustrate the position of the improved lock.

Figure 2 is a longitudinal section thereof taken substantially on the line 2—2 of Figure 1.

Figure 3 is a horizontal section on the line 3—3 of Figure 2, the mechanism being in the locked position.

Figure 4 is a horizontal section on the line 4—4 of Figure 2.

Figure 5 is a horizontal section on the line 5—5 of Figure 2.

Figure 6 is a longitudinal section, similar to Figure 2, the mechanism being in the unlocked position.

Figure 7 is a detail section on the line 7—7 of Figure 4.

In carrying out the invention provision is made of a casing generally designated 1, for the purpose of housing the lock mechanism. The casing is composed of outer and inner sections 2 and 3. These are of elongated formation (Figs. 3, 4 and 5) and fit into each other. When thus fitted together they are secured by screws 4 (Figs. 2 and 4), but the removal of these screws will not permit the disassembly of the sections for several reasons that presently appear.

The casing 1 is held in place upon the instrument board 5 in any suitable manner, and when mounted in place, all that shows on top of the instrument board is the face of the section 2 (Fig. 1) the knob 6 and dial 7 of the combination lock, and the flanged head 8 of the steering post nut 9. The dial 7 is graduated and numbered, as is common in combination locks, the operation of the lock requiring turning of the knob 6 to the right until graduation "14" upon the dial registers with the mark 10 on the face of the casing. It is to be observed that the casing has a number of similar marks radiating from the periphery of the dial, this merely being for the purpose of deception. The authorized owner must be able to identify the particular mark with which registration of the dial graduations must be made in order to open the lock.

Situated inside of the casing 1 is a locking plate 11. This plate accurately fits the interior of the casing section 3, but is loose enough to move up and down because it is the function of the plate to move up and down bodily by means of the knob 6 when the combination has been properly worked. One end of the plate has a non-circular opening 12 (Fig. 3) arranged to fit upon a similar non-circular portion 13 of the steering post nut 9. When thus fitted in place upon the nut it becomes impossible to turn the steering post 14 (see Fig. 2). The steering post is firmly held within the nut 9 by a tapered and split sleeve 15 which wedges against the steering post by a split collar clamping nut 15ª which is screwed in place at 16 by means of a suitable spanner wrench at 17. The nut 9 extends completely across the casing 1, the lower extremity appearing at the bottom of the inner section 3 (Fig. 2).

Immediately above this place is a circular groove 18 into which the adjacent semicircular portion 19 of a slide lock 20 is arranged to fit to prevent extraction of the steering post nut 9 from the casing 1. A moment's consideration of Figure 2 will make it apparent that the removal of the screws 4 (mentioned before) will not make it possible to separate the inner section 3 from the outer section 2 while the slide block 20 is in position as stated. This engagement of the slide block with the groove 18 both prevents pulling the nut 9 upwardly and the inner section 3 downwardly. The upper edges of the opening 12 in the locking plate 11 are beveled at 21 making it easier to move said plate 11 upon the non-circular portion 13 when locking the mechanism.

Guides 22 (Figs. 2, 4 and 5) secured to or cast upon the sides of the inner casing section 3, hold the slide block 20 in place against the inner section. The slide block has limited movement against the section beneath said guides. The slide block has a heel 23 which is engaged by a stop plate 24, thus preventing movement of the slide lock and consequently preventing the release of the nut 9 with the consequences already stated. The slide lock is cut out at 25 to make room for terminals 26, 27 and 28.

The stop plate 24 is an integral member of a closure plate 29 which fits flush with the inner section 3 at the bottom (Figs. 2, 6 and 7). The closure plate 29 and the rabbet 30 of the opening 31 are circular. The opening 31 is not circular and neither is the stop plate 24. But the stop plate and opening are the same in shape, (Figs. 4 and 5). The opening 31 extends lengthwise with the casing. The stop plate 24 is presented in registration with the opening 31, pushed through and given a one-quarter turn (Figs. 4 and 5) whereupon the stop plate rides upon the inner surface of the section 3 (Fig. 7) thus holding the closure, stop plate and carried parts in place.

A screw 32 is then employed to secure the closure. This screw passes through the closure 29 and the adjacent flange portion of the section 3. The screw extends well into the casing. A portion cut away at 33 provides a shoulder against which the recess 34 of a stop lug 35 rests when the mechanism is in the locked position as in Figure 4. This engagement of the shoulder 33 prevents unscrewing and removal of the screw 32 while the mechanism is locked. It is therefore impossible to remove the closure plate 29 and thus gain access to the interior. But when the mechanism is unlocked, the screw 32 may be removed because the stop lug 35 and recess 34 will be in locations other than shown (Fig. 4).

A knob 36 on the closure plate 29 permits of such handling of the closure plate as is necessary in inserting and removing the stop plate 24 from the casing. Such handling occurs only at rare intervals, usually only when assembling the lock. The knob 36 plays no part in the operation of the lock. It is located at the bottom of the casing out of the way.

The stop plate is the foundation upon which a series of tumblers 37, 38 and 39 is mounted. These tumblers consist of circular plates, each of which has a notch 40 (Figs. 4 and 5) in the periphery. The notches must be brought to alignment to form a groove when working the combination to open the lock. The tumblers are separated by rings 41. Each of these has a projection 42 which is insertible into any one of a plurality of apertures 43 in the tumbler with which it is associated. The combination is changed by making different adjustments of the projections and tumblers.

The projections 42 extend through the various tumblers so that the projection of one tumbler may provide the actuating element for the tumbler next lowest. The construction, operation and adjustment of the tumblers alone is conventional. A sleeve 44 provides the support upon which the tumblers are rotatable. A suitable washer 45 upon the sleeve holds the tumblers in place. The tumblers are operated by a lug 46 on the underside of an actuator disk 47. This disk has hollow stems 48 and 49 extending upward and downwardly respectively. The lower stem 49 extends into the bore 50 of the stop and closure plates 24 and 29. These plates, it will be remembered, always remain stationary, but the disk 47 and its carried stems are rotatable.

Rotation is produced by the knob 6. This knob includes a hub 51 and a pendant spindle 52. The spindle has a key 53 which occupies a groove 54 on the interior of the stems. The spindle 52 is co-extensive with the lower stem 49. A screw 55 is introduced in the end of the spindle (Figs. 2 and 6) holding the two parts together. The head of the screw extends over the edge of the stem 49 to accomplish the purpose. The hub 51 of the knob 6 fits in the recess 56 of a screw block 57. The hub and recess are circular. The hub is capable of turning freely in the recess without turning the screw block, at such time when the mechanism is locked (Fig. 2), but the screw block turns with the hub when the combination has been properly worked, thereby causing lowering of the locking plate 11 to release the nut 9 and permit turning of the steering post 14. For the above purpose, the locking plate 11 has a boss 58 which is internally threaded to receive the threads of the block 57. The mounting of the screw block 57 is that of a swivel. It is capable of turning but is held against endwise motion.

A barrel 59, pendant from the screw block 57, contains the tumblers 37, 38 and 39 of the combination lock (Figs. 2 and 6). It has a projection 60 at one side providing a pivotal mounting at 61 for a dog 62. It also has an opening 63 which the heel 64 of the dog occupies. A spring 65, suitably disposed between the dog and barrel, moves the dog upon its pivot in such a manner that the opening is always occupied by the heel. The dog has a flange 66 which extends back a considerable distance. The flange is circular. The flange includes a thin portion 67 which is capable of riding between the peripheral portions of the stop plate 24 and the adjacent wall of the inner casing section 3.

The engagement of the extremity of the flange (Fig. 5) with the lower edge of the front plate 24 prevents rocking of the dog upon its pivot 61 in the counterclockwise direction, thus insuring the retention of the heel 64 with the various registering notches and preventing any accidental locking of the mechanism. The notches in question are those 40 in the tumbler disks and a master notch 68 in the actuator 47. One shoulder 69 of this notch is square but the other shoulder 70 is rounded. The stop plate 24 has lugs 71 and 72 (Fig. 5) with which the projection 60 is engageable to limit the movement of the screw block 57 in both directions of turning.

One of the lugs is larger than the other. It is the lug 71 that extends a little past the center line of the stop plate 24, and it is through this lug that the screw 32 (Fig. 7) passes in order that the shoulder 33 may be presented to the recess 34 (Fig. 4) of the stop lug 35 on the barrel 59 as mentioned before. It is for the purpose of accomplishing this engagement that the screw 32 extends well into the casing, as already stated. The engagement of the stop lug 35 with the screw 32 limits turning of the screw block 57 in the clockwise direction, thus aiding the function of the lug 72, but the main object of the engagement of the screw shoulder 33 by the lug 35 is to prevent the removal of the screw and the consequent disassembling of the lock.

Mention has been made of contacts 26, 27 and 28 within the casing. These have complementary contactors 73, 74 and 75 (Fig. 3). These various contacts and contactors may be regarded as controlling ignition, lighting and horn circuits. The details of the circuits are not shown, only the ignition circuit being illustrated diagrammatically in Figure 5 to convey an idea how two of the contacts may be utilized. It is anticipated that the circuit arrangements may be entirely different in different makes of automobiles, it being regarded as sufficient to say that when the mechanism is locked as in Figure 2 the contactors and contacts are separated, thus opening the circuit and when the mechanism is unlocked as in Figure 6 the various contacts and contactors are in engagement and the circuits are closed.

Provision is made of an auxiliary lock within the knob 6. The cylindrical portion 76 is intended to represent the barrel of a lock. This lock is capable of operation by a suitable key 77 (Fig. 2) when the cap 78 of the knob is removed. The operation of the lock throws a bolt 79 in such a manner as to frictionally engage the wall of the screw block 57 in which the hub 51 of the knob is situated. For this purpose the hub has a segmental opening as at 80 (Fig. 3).

The operation is now readily understood. Assume that the mechanism is locked. Under this condition the locking plate 11 is raised in the casing 1 (Fig. 2) so that the non-circular opening 12 (Fig. 3) is superimposed upon the non-circular portion 13 of the nut 9. This nut is fixed upon the steering post 14, and when the non-circular portions are in the engagement stated, turning of the steering post becomes impossible. The same position of the wrench 11 finds the various contacts 26, 27, 28 (Fig. 5) and contactors 73, 74 and 75 (Fig. 3) in disengagement, thereby indicating that the various ignition, lighting and horn circuits which they represent are open.

Turning of the knob 6 causes turning of the spindle 52 and the actuator disk 47 which is keyed thereto at 53. The turning of the knob is quite free in both directions, and each turning movement of the knob produces a response in the actuator disk 47 because the two are keyed together as stated. Up to this time, the turning of the knob has no effect upon the screw block 57.

According to the particular combination selected, the knob 6 should be turned in the clockwise direction. The lug 46 on the actuator disk 47 comes into engagement with the first projection 42 of the upper tumbler disk 37 and carries the upper tumbler along. Each of the tumblers has a similar projection. Three or more rotations of the knob 6 will produce such interengagement of tumblers and projections that the various tumbler notches 40 (Fig. 4) are brought into alignment to produce a groove. The groove is brought into registration with the heel 64 of the dog 62 (Fig. 4) when graduation "14" on the dial 7 registers with the mark 10 on the exposed face of the casing 1.

But the heel 64 of the dog is prevented from dropping into the groove thus formed by the edge of the actuator disk 47. This disk has a master notch 68 which is found to be in a non-registering position. This, the reader will understand, is due to the relationship of the upper most projection 42, the actuator lug 46 and the master notch 68 itself.

The knob 6 is now turned counterclockwise until the master notch 68 registers with the groove 40. The spring 65 now rocks the dog on its pivot and causes the heel 64 to drop into the complete groove.

Turning of the knob 6 in the counterclockwise direction is continued until the projection 60 by which the dog 62 is carried strikes the lug 71 (Fig. 5). This turning of the knob carries the screw block 57 (Fig. 2) with it by virtue of the engagement of the heel 64 with the tumbler groove, the locking plate 11 being accordingly lowered until the position in Figure 6 is assumed. The lug 71 stops the turning movement in the counterclockwise direction. The thin portion 67 of the dog flange assumes a position behind the lower edge of the stop link 24 (Fig. 5) and prevents such rocking of the dog as will permit the disengagement of the heel 64 with the tumbler groove.

Rotation of the knob 6 to the right turns the screw block 57 in the opposite direction so that the locking plate 11 is again raised. Such turning may continue until the projection 60 strikes the lug 72 (Fig. 5). At such time the locking plate 11 is fully raised (Fig. 2). Continued turning of the knob 6 will cause the rounded shoulder 70 of the master notch 68 to ride beneath the heel 64 and move it out of the tumbler groove. The point of the heel will then bear against the periphery of the actuator disk 47. A few turns of the knob 6 in both directions will soon move the tumbler notches 40 out of registration and thereby destroy the combination. The mechanism is then again locked, and the various circuits opened.

To disassemble the lock it is necessary to first unlock the mechanism. The shoulder 33 of the screw 32 occupies the recess 34 of the stop lug 35 (Fig. 4) as long as the mechanism is locked, thereby preventing turning and consequent removal of the screw 32. As it is necessary to remove this screw before anything can be taken apart, it is obviously necessary to first unlock the mechanism. When thus unlocked, the parts concerned will stand in the position in Figure 5. The screw 32 is now free to turn.

Removal of the screw 32 permits counterclockwise rotation of the stop plate 24 by means of the knob 36 until the stop plate registers with the opening 31 in the casing. The stop and closure plates 24 and 29 will come out together with the various tumbler disks 37, 38 and 39, carried thereby. The actuator disk 47 is held upon the stem 52 by the screw 55. This screw must be removed before the knob 6 can be withdrawn upwardly from the casing. It is obvious that this is so because the screw head bears against the stem 49 of the actuator disk 46 which in turn is held against upward movement by the screw block 57.

Upon removal of the screw 55 the knob 6 and its carried parts can be drawn upward and out. The casing 1 is now tilted to the right so that the slide lock 20 moves sufficiently far to release the nut 9 at the circular groove 18. The nut 9 and the steering post 14 can now be withdrawn. The immediately foregoing operations are based on the presumption that the lock casing 1 has been taken down from the instrument board. An effort to disassemble the lock while in place on the instrument board would be extremely difficult, if not impossible. It is intended to make it difficult or impossible to disassemble the lock because protection of the parts involved is the fundamental purpose.

However, assuming that the nut 9 has been withdrawn, it requires only another step to withdraw the inner casing section 3 from the outer section 2. To make this possible, it is first necessary to remove the screws 4, but removal of these screws without all of the foregoing acts will not permit the disassembly of the mechanism. The plate 11 and screw bar 57 are now readily taken out. The dog 66 is carried by the barrel 59 of the screw block and may be regarded as a part thereof. Assembly of the lock occurs in reverse order.

We claim:—

1. In combination with a revoluble part of the steering mechanism of a vehicle, a non-circular portion upon said revoluble part, a locking plate having a corresponding non-circular opening, and means situated parallel to the axis of said revoluble part for bodily shifting the locking plate in a direction parallel to the axes of said revoluble part and said parallel means.

2. In combination with a revoluble member of steering mechanism, said member having a non-circular portion, a locking plate having a corresponding non-circular opening, said plate occupying a plane at right angles to said revoluble member, means to shift the plate bodily in a direction parallel to the axis of said member, thereafter to continuously move said plate into planes successively parallel with each other, either for engagement or disengagement of the opening with said non-circular portion, an electrical circuit including a contact, and a contactor carried by said locking plate being engageable or disengageable in respect to the contact according to the position of the said plate.

3. In combination with a revoluble part of steering mechanism having a non-circular portion, a screw, a locking plate having threaded engagement with the screw and an opening corresponding with said non-circular portion and means for turning the screw bodily shifting the locking plate in a direction permanently parallel to the axes of the screw and said revoluble part for the purpose described.

4. In combination with a revoluble part of steering mechanism having a non-circular portion, a locking plate having a corresponding opening, a screw block, a boss forming part of the locking plate having a threaded opening to receive the screw block which supports the locking plate in a position at right angles to the revoluble part, and means to turn the screw block to bodily shift the locking plate in respect to said non-circular portion for the purpose described.

5. In combination with a revoluble part of steering mechanism having a non-circular portion, a locking plate having a corresponding opening, a screw block, a boss forming part of the locking plate having a threaded opening to receive the screw block which supports the locking plate in a position at right angles to said revoluble part, means to turn the screw block to bodily shift the locking plate in respect to said non-circular portion, and means limiting the turning of the screw block in either direction to thereby maintain the locking plate in the aforesaid position at either extremity of its shiftable movement.

6. In combination with a revoluble part of steering mechanism having a non-circular portion, a locking plate having an opening conforming with said portion, a boss on the locking plate having a threaded opening, a screw block which is operable in the opening serving to both support the locking plate in a position at right angles to said revoluble part and to shift the plate in a direction parallel to said revoluble part into engaging and disengaging positions in respect to the non-circular portion, a combination lock which is operable according to a prearranged combination, and means which act upon proper working of the combination to permit turning of the screw block in either direction with the results stated.

7. In combination with a revoluble part of steering mechanism having a non-circular portion, a locking plate having an opening conforming with said portion, a boss on the locking plate having a threaded opening, a screw block which is operable in the opening serving to both support the locking plate in a position at right angles to said revoluble part and to shift the plate in a direction parallel to said revoluble part into engaging and disengaging positions in respect to the non-circular portion, a combination lock which is operable according to a prearranged combination, means which act upon proper working of the combination to permit turning of the screw block in either direction with the results stated, and means limiting turning of the screw block in both directions thereby to limit the shifting movement of the plate in both directions.

8. In combination with a revoluble part of steering mechanism having a non-circular portion, a locking plate having an opening conforming with said portion, a boss on the locking plate having a threaded opening, a screw block which is operable in the opening serving to both support the locking plate in a position at right angles to said revoluble part and to shift the plate in a direction parallel to said revoluble part into engaging and disengaging positions in respect to the non-circular portion, a combination lock which is operable according to a prearranged combination, means which act upon proper working of the combination to permit turning of the screw block in either direction with the results stated, means to limit said turning of the screw block in that direction according to which the locking plate is shifted into the locking position, and means then rendering said acting means inoperative to turn the screw block further upon continued turning of the combination lock in the same direction.

9. An automobile lock comprising a nut securable to a movable part of steering mechanism, a locking plate having a portion conforming to the nut, a swivelly mounted screw having threaded engagement with the locking plate, a dog carried by the screw and being the operative element by which turning of the screw is ultimately accomplished, and means which is freely revoluble in both directions to establish a relationship upon which a necessary movement of the dog can be accomplished so that subsequent rotation of said means causes turning of the screw to bodily shift the locking plate in respect to the nut for either a locking or an unlocking action.

10. An automobile lock comprising a nut securable to a movable part, a locking plate having a portion conforming to the nut, a screw having threaded engagement with the locking plate, a dog, a barrel carried by the screw having an opening in which the dog is operative, a combination lock including a spindle which is freely revoluble in both directions, a series of tumblers having notches, an actuator disk being revoluble by the spindle and having means for causing alignment of the tumbler notches to form a groove, and a master notch in the actuator disk completing the groove to permit an entering movement of the dog procuring a grip upon the screw by which turning in either direction is subsequently accomplished to shift the locking plate either into locking or unlocking engagement with the nut.

11. An automobile lock comprising a nut securable to a movable part, a locking plate having a portion conforming with the nut, a swiveled screw in permanent threaded engagement with the locking plate, a dog, a barrel on the screw having an opening through which the dog is movable, an actuator disk situated in the barrel preventing entrance of the dog at the opening, a spindle by which the disk is freely turned in both directions, a series of tumblers having notches, means for so manipulating the tumblers as to align the notches to form a groove, said means including a lug on the disk, and a master notch in said disk aligning with said notches to complete the groove for access of the dog into gripping engagement with said disk and tumblers so that turning of the spindle results in turning of the screw for a consequent shifting of the locking plate in respect to the nut.

12. An automobile lock comprising a casing, a nut rotatably mounted upon the casing and being securable to a rotatable part and having a non-circular portion, a locking plate situated in the casing having a corresponding non-circular portion, a series of notched tumblers constituting an element of a combination lock, a knob and dial outside of the casing by which a prearranged combination is worked, a screw in permanent threaded engagement with the locking plate, a dog carried by the screw, an actuator disk having a master notch, said dog being held from gripping engagement with the actuator disk by the peripheries of the disk and tumblers until all notches align, and a spindle operated by the knob to turn the disk and tumblers in a predetermined manner until such notches do align whereupon turning of the screw may follow for a corresponding shifting of the locking plate in respect to the non-circular portion of the nut.

13. An automobile lock comprising a casing, a nut revolubly mounted in the casing having a non-circular portion, means by which a revoluble steering part is securable in the nut, a locking plate operable in the casing having a non-circular part conforming to the nut, a swivelly mounted screw having threaded engagement with the locking plate, a dog pivoted upon the screw, an element which is freely revoluble within the screw and with which the dog must have gripping engagement before turning of the screw can be accomplished, and tumblers constituting elements of a combination lock requiring a predetermined relationship with said element, they and said elements requiring a predetermined relationship with the dog so that said grip can be secured for the turning of the screw and shifting of the locking plate in respect to the non-circular nut.

14. An automobile lock comprising a casing, a nut revolubly mounted in the casing, means by which it is fixedly attached to a steering post, means including a slide lock for engaging the nut so as to prevent extraction thereof from the casing, and means which is introduced into the casing obstructing the retraction of said lock from the nut.

15. An automobile lock comprising a casing, a nut fitted in the casing from front to back and having a circular groove, means by which the nut is fixed to a steering post, a slide lock having a circular portion fitting in the groove permitting rotation of the nut but preventing extraction of the nut from the casing, means including guides in the casing in respect to which the lock is slidable, and means introduced into the casing being situated in the path of a portion of the lock preventing retraction thereof from engagement with the nut.

16. An automobile lock comprising a casing, a nut fitted in the casing from front to back and having a circular groove, means by which the nut is fixed to a steering post, a slide lock having a circular portion fitting in the groove permitting rotation of the nut but preventing extraction of the nut from the casing, means including guides in the casing in respect to which the lock is slidable, means introduced into the casing being situated in the path of a portion of the lock preventing retraction thereof from engagement with the nut, a screw introduced into the casing through said means, said screw having a shoulder, and means inside of the casing against which said shoulder fits preventing turning of the screw for removal.

17. An automobile lock comprising a casing, a nut which is revoluble therein and securable to a steering post, a lock which is movable against the nut to provide a swivel mounting, a plate introduced in the casing and so situated that retraction of the lock is prevented, a shouldered screw introduced through the casing and plate to prevent movement of the plate in its location, a locking plate which is engageable with the nut to hold it and the steering post from rotation, a screw in threaded engagement with the locking plate being revoluble to shift the locking plate to an unlocking position, and a stop lug upon part of the second screw having a recess receiving the shoulder of the first screw to prevent turning thereof while the locking plate holds the nut.

18. An automobile lock comprising a casing, through which a steering post is extensible, a nut revoluble in the casing being securable to the steering post, a locking plate, a swiveled screw by which the locking plate is operable to assume locking and unlocking positions in respect to the nut, a projection on a part of the screw, a pair of lugs with which the projection is engageable to limit turning of the screw in all directions, a stop plate by which the lugs are carried, an opening in the casing of such shape to admit the stop plate but holding said plate positioned upon giving the plate an appropriate turn to properly position the lugs, a closure for the opening being part of the plate, and a knob on said closure providing a finger hold for such manipulation of the plates as are required.

19. An automobile lock comprising a casing, through which a steering post is extensible, a nut revoluble in the casing being securable to the steering post, a locking plate, a swiveled screw by which the locking plate is operable to assume locking and unlocking positions in respect to the nut, a projection on a part of the screw, a pair of lugs with which the projection is engageable to limit turning of the screw in all directions, a stop plate by which the lugs are carried, an opening in the casing of such shape to admit the stop plate but holding said plate positioned upon giving the plate an appropriate turn to properly position the lugs, a closure for the opening being part of the plate, a shouldered screw introduced through said plate and a portion of the casing into the interior, and a recessed lug being part of the locking plate operating screw receiving the shouldered screw to prevent removal of the latter and preventing consequent access to the interior of the casing.

20. An automobile lock comprising a revoluble nut being securable to a steering post and having a non-circular portion, and a locking plate having an opening through which the nut extends, said opening being correspondingly non-circular and having a beveled approach facilitating fitting together of the non-circular portions upon an appropriate motion of the plate.

21. An automobile lock comprising a locking plate having a threaded opening, a swiveled screw being operable in said opening to shift the locking plate up and down, a revoluble knob having a hub situated in said screw, and a lock occupying the knob and provided with a bolt extensible through the hub into frictional engagement with an adjacent part of the screw to prevent rotation of the screw by revolution of the knob.

VICTOR L. GILPIN.
CHESTER READ WELLS.